(12) United States Patent
Bonald et al.

(10) Patent No.: US 7,821,933 B2
(45) Date of Patent: Oct. 26, 2010

(54) APPARATUS AND ASSOCIATED METHODOLOGY OF PROCESSING A NETWORK COMMUNICATION FLOW

(75) Inventors: Thomas Bonald, Voisins le Bretonneux (FR); Luca Muscariello, Paris (FR)

(73) Assignee: France Telecom, Paris (FR)

( * ) Notice: Subject to any disclaimer, the term of this patent is extended or adjusted under 35 U.S.C. 154(b) by 85 days.

(21) Appl. No.: 12/183,934

(22) Filed: Jul. 31, 2008

(65) Prior Publication Data

US 2009/0059787 A1   Mar. 5, 2009

(30) Foreign Application Priority Data

Aug. 31, 2007   (FR) .................................. 07 57305

(51) Int. Cl.
*H04L 12/56* (2006.01)
(52) U.S. Cl. ...................................... 370/230; 370/412
(58) Field of Classification Search ................. 370/230, 370/412

See application file for complete search history.

(56) References Cited

U.S. PATENT DOCUMENTS

2005/0068798 A1*   3/2005   Lee et al. ....................... 365/49

FOREIGN PATENT DOCUMENTS

| WO | WO 2005/096546 A2 | 10/2005 |
| WO | WO 2006/051465 A1 | 5/2006 |

* cited by examiner

*Primary Examiner*—Melvin Marcelo
(74) *Attorney, Agent, or Firm*—Oblon, Spivak, McClelland, Maier & Neustadt, L.L.P.

(57) ABSTRACT

The disclosure relates to an apparatus and associated methodology for processing flows. Data packets belonging to various flows are received by a device of a communications network and stored in a queue so as the device retransmits them. In order to re-transmit a data packet, a flow is selected, to which the least memory space in the queue is allocated. A packet from the selected flow is retransmitted and extracted from the queue, and when the memory space available in the queue does not allow a received packet to be stored. Further a flow is selected to which the most memory space in the queue is allocated and a data packet of the selected flow is eliminated from the queue.

9 Claims, 2 Drawing Sheets

APPARATUS AND ASSOCIATED METHODOLOGY OF PROCESSING A NETWORK COMMUNICATION FLOW

CROSS REFERENCE TO RELATED APPLICATION

This application claims the benefit of priority under 35 U.S.C. §119 of French Patent Application No. 07 57305, filed on Aug. 31, 2007. The entire contents of these applications are incorporated herein by reference.

BACKGROUND

The disclosure relates to a technique for processing a flow in a communications network, and, more particularly, communication of packets across a communications network. An increasing number of services are being deployed over access points to a communications network using packets, for example to the Internet, whether they be fixed or mobile. These services relate for example to voice calls, video file transfers, games and Web Services. By their nature, they have different quality of service requirements in terms of delay and of packet loss rates.

The IETF, acronym for "Internet Engineering Task Force", recommends the implementation of a technique called Diffserv ("Differentiated Services") for differentiating flows relating to a service according to the required quality of service. This technique is specified in RFC 2475 and allows the packets of a flow relating to a service to be explicitly marked according to the required quality of service. The flows are thus grouped into different classes of service. Upon receiving a packet, a device on the network is able to determine a class of quality of service and, during processing of the packet, to apply a processing procedure according to the class of quality of service determined. Certain flows can thus be allocated priority processing by the equipment on the network. In view of the fact that each packet must be explicitly marked, this technique is very difficult to implement in a network.

There is therefore a need for a technique allowing differentiated processing of the flows transiting at a point of a communications network to be facilitated.

SUMMARY

A method is provided for processing flows, data packets belonging to various flows are received by a device of a communications network and stored in a queue so as the device retransmits them. A flow is selected from among flows having packets stored in the queue according to a pre-determined criterion depending on the memory space allocated to said selected flow in the queue.

At least one data packet from the selected flow is processed, and extracted from the queue.

The method for processing flows is noteworthy in that, in order to re-transmit a data packet, the selection includes the selection of a flow to which the least memory space in the queue is allocated. The processing includes the re-transmission of the at least one packet from the selected flow. When the memory space available in the queue does not allow a received packet to be stored, the selection includes the selection of a flow to which the most memory space in the queue is allocated and the processing includes the elimination of a data packet of the selected flow from the queue.

First of all, it will be pointed out that, thanks to the above methodology, marking of the packets is no longer necessary. Flows relating to a real-time service are naturally regulated by the emitter of the flow, notably because of a data rate limited by the emitter. Thus, few data packets of such a flow are waiting in a queue of a device of the network in order to retransmit. In contrast, flows relating to a non-real-time service, for example a data transfer service, are not regulated at their emission and many packets of such a flow may be waiting in this queue. It is therefore observed that the memory space allocated to real-time flows is small with respect to that allocated to non-real-time flows. The observation of the memory space allocated to a flow thus allows the flows to be differentiated and a differentiated processing can then be applied to the latter.

Moreover, using the techniques of the prior art, the association between a service and a class of quality of service is generally fixed; however, the appearance of a new service may require these associations to be reviewed, which is complex and not necessary with the method according to the invention.

Furthermore, the same flow may comprise various parts, these various parts respectively corresponding to various services. These may for example be, in the same flow, a telephone conversation, requiring real-time processing, followed by a transfer of files intended for post-processing by the receiver. Thus, the various parts of such a flow can undergo separate processing operations, in contrast to the techniques of the prior art. It is indeed possible to vary the processing over time, notably according to the nature of the various parts of this flow.

Thus, a predetermined criterion is used, depending on the memory space allocated to a flow in a queue, for selecting a flow from amongst the plurality of flows having packets waiting for re-transmission and for processing at least one data packet from the selected flow waiting in the queue.

It is not therefore necessary to explicitly mark the data packets and to then interpret fields for the header of the packet in order to determine a class of quality of service associated with the flow. The processing is therefore simple to implement and independent of the support or otherwise for an explicit marking function, required by the DiffServ technique.

The method for processing flows is implemented in a device of the communications network capable of transporting data packets. This may for example be a router upstream of the DSLAM, or Digital Subscriber Line Multiplexer, in the DSL collection network, a residential gateway, an output equipment from a local network, etc. It is independent of the direction of transmission of the data packets.

By selecting a flow to which the least memory space is allocated in the queue, in comparison with the other flows waiting in the queue, a flow requiring a differentiated processing is determined. A packet from this flow is processed and the packet is re-transmitted. The real-time flows, by nature more sensitive to the delay and to the packet loses, thus benefit from priority processing when the packets in the queue are processed.

When the memory space available in the queue does not allow a received packet to be stored, a flow is determined to which a significant memory space is allocated in comparison with the other flows that have packets waiting. The differentiated processing allows memory space to be freed, by eliminating a packet from a non-priority flow, in order to make memory space available necessary for new packets received by the device. For example, data transfer streams are, generally speaking, more tolerant to the delay and to the loss of packets, notably because of a protection implemented within layers of higher level than the layers of level 2 and 3 of the OSI reference model.

Furthermore, the step for selection of a flow to which the most memory space in the queue is allocated is reiterated, for as long as the memory space available in the queue does not allow the received packet to be stored.

Indeed, in the case of packets of variable length, the memory space made available by the elimination of a packet does not necessarily allow the received packet to be accepted.

In addition, the steps of the method are carried out during the processing of data packets within a layer of level 2 or 3 of the OSI reference model.

The processing of the flows may be carried out within various layers of the OSI reference model and, more precisely, the layers of level 2 and 3. These are the MAC, for "Medium Access Control", LLC, for "Link Logical Control" or IP, for "Internet Protocol", layers.

In one embodiment, the steps of the method are applied to the flows of a user of the communications network, prior to processing the flows of at least one user of the network according to a method for equitable ordering.

The various steps of the method for processing the queue of the flows of a user are carried out, prior to processing the flows of all of the users. Thus, the management of the priorities is carried out within the flows of a given user. A user who only has a single active flow, of the data transfer type, is not penalized when his data packets are processed.

The disclosure also relates to a device for processing flows in accordance with the above described methodology.

BRIEF DESCRIPTION OF THE SEVERAL VIEWS OF THE DRAWINGS

The description will be better understood with the aid of the following description of a particular embodiment of the method of the invention, with reference to the appended drawings, in which.

DETAILED DESCRIPTION

Figure 1:
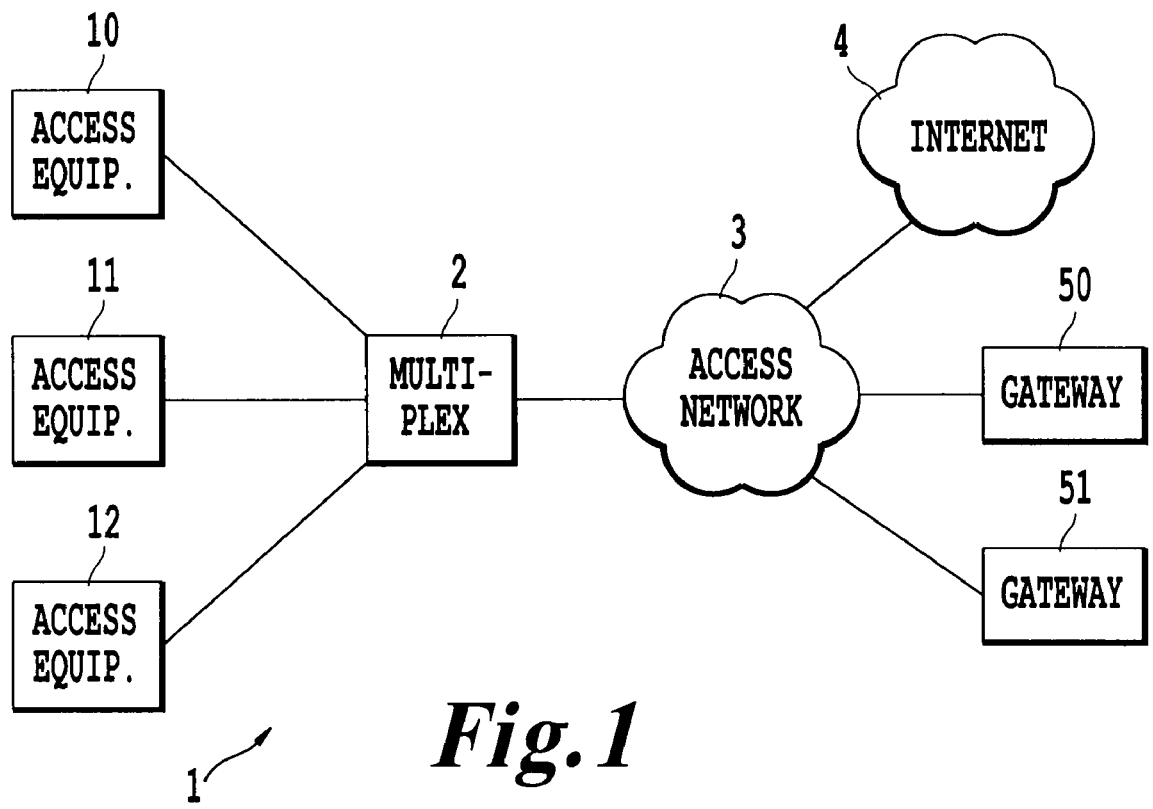
FIG. 1 shows a high level block diagram of communications system in accordance with an exemplary embodiment.

FIG. 1 shows a communications system 1 allowing users to access various services such as telephony, television, video-on-demand or the Internet. Each user is connected to the system by means of an access equipment 10, 11, 12 for the communications system 1. The access equipment 10, 11, 12 can be a router, with a radio access terminal or a modem, and is connected to a multiplexing node 2. This multiplexing node 2 can for example be a router, a switch or a base station. This multiplexing node 2 is itself connected to an access network 3. The latter allows users to access the Internet 4 or various services via servers or service gateways 50, 51.

When a user accesses a particular service 4, 50, 51, data packets are exchanged between the access equipment of the user 10, 11, 12 and a service, in other words an equipment of the Internet network 4 or a service gateway 50, 51.

In the following, "flow" refers to all of the data packets of a user associated with the same application instance, for example a telephone conversation, the transmission of a video stream, the download/upload of a file, etc. By way of non-limiting example, a flow may be identified within a network of the IP (Internet Protocol) type by the five-fold set: source address, destination address, source port number, destination port number and protocol (TCP for "Transmission Control Protocol" or UDP for "User Datagram Protocol"). In the case of the IPv6 protocol, the flow can simply be identified by the field "Flow ID" provided for this purpose. It will be noted that the identification of the flow is carried out simply by reading the fields of the protocol headers. Furthermore, the same flow may comprise various parts, these various parts having different requirements for quality of service. For example, in the same flow, there might be a telephone conversation, requiring real-time processing, followed by a transfer of files intended for post-processing by the receiver. There might also be browsing over a website comprising an interactive part for consulting pages, by its nature sensitive to the delay and packet loss rate, followed by a part for transfer of files, by its nature more tolerant to the delay and to the loss of packets.

The data packets are routed via various types of equipment of the communications system: the access equipment 10, 11, 12, the multiplexing nodes 2 and routers of the access network 3.

These various equipments process the data packets in order to transport them between a source equipment and a destination equipment. In a known manner, these equipments receive the data packets, store them in a queue and transmit them according to routing criteria.

By way of example, the case of transport of data packets within a network of the IP type is considered. An equipment contributing to the transport of the data implements the various layers of the OSI reference model, more precisely the layers of level 2 and 3. These are the MAC, for "Medium Access Control", LLC, for "Link Logical Control" or IP, for "Internet Protocol", layers. These various layers generally implement queues for the exchanges between them. The situation within one particular layer is considered here. The data packets received by this layer coming from a higher layer are stored in a queue and are re-transmitted to the lower layer in order to process them.

By way of example, a particular embodiment is considered where the method is implemented in the LLC layer and notably in the management of the queue of the packets of data from the higher IP layer to the lower MAC layer.

Figure 2:
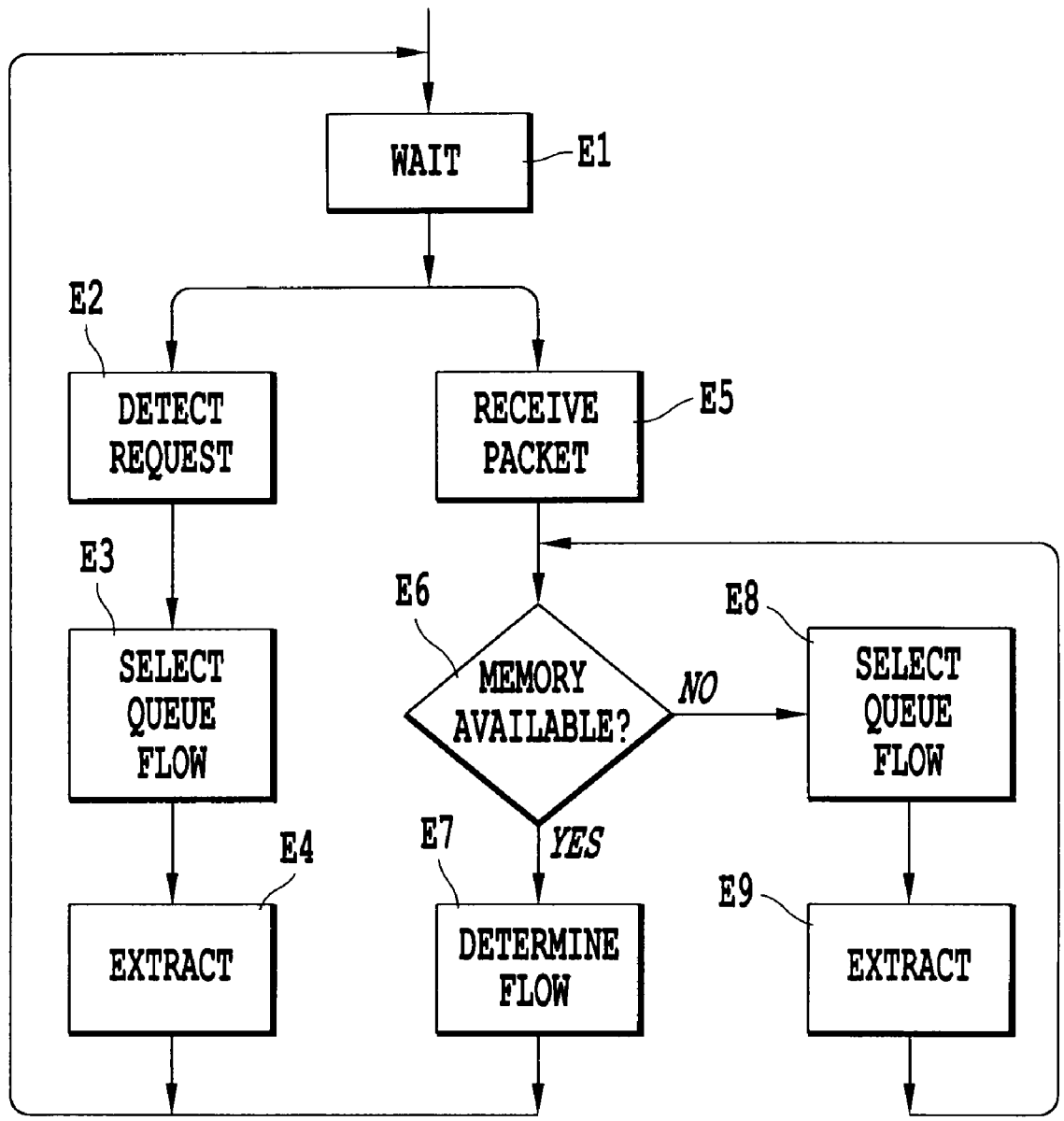
FIG. 2 is a flow chart of an exemplary methodology.

The method for processing flows in this particular embodiment will now be described in relation to FIG. 2.

In a first wait step E1, the method waits for an event.

In a step E5, a data packet to be transmitted is received from the IP layer.

In a step E6 for testing the memory space available, it is verified whether or not the packet can be stored in the queue, in other words whether the memory space available in the queue exceeds the size of the packet received.

If the free memory space in the queue is sufficient with respect to the size of the packet received, in a step E7, the flow to which the data packet belongs is determined based on the header of the data packet, for example by the five-fold set {source address, destination address, source port number, destination port number and protocol}, and the packet is stored in the queue. Information relating to the memory space allocated to this flow is also updated. The method then returns to the event wait step E1.

If the free memory space in the queue is insufficient with respect to the size of the packet received, in a first step E8 for selection of a flow, a flow is selected from amongst the flows having packets stored in the queue according to a pre-determined criterion depending on the memory space allocated to said selected flow in the queue. More precisely, a flow is selected to which the most memory space in the queue is allocated.

In a first processing step E9, a packet of the selected flow is extracted and it is eliminated from the queue. The information relating to the memory space allocated to the selected flow is updated following the elimination of the packet.

A flow to which a significant memory space is allocated compared with the other flows that have packets waiting is a non-priority flow. The differentiated processing allows memory space to be freed up, in order to make available memory space necessary for a new packet received by the device. Non-priority flows, such as the flows for data transfer, are more tolerant of the delay and of the loss of packets, notably because of a protection implemented in layers of higher level than the layers of level 2 and 3 of the OSI reference model. Thus, at least one data packet of a non-priority flow is eliminated from the queue, without having previously marked the packets according to a class of quality of service. In one common mode of operation for queue management, in such a case of saturation, the received packet is not processed. This eliminated packet might belong to a priority flow.

The method then returns to the step E6 for testing the memory space available. Indeed, in the case of packets of variable length, the memory space made available by the elimination of a packet does not necessarily allow the received packet to be accepted.

In a step E2, a request is detected originating from the MAC layer aiming to obtain a data packet to be re-transmitted.

In a second step E3 for selection of a flow, a flow is selected from amongst the flows having packets stored in the queue according to a pre-determined criterion depending on the memory space allocated to said selected flow in the queue. More precisely, a flow is selected to which the least memory space in the queue is allocated.

In a second processing step E4, a packet belonging to the selected flow is extracted from the queue and it is transmitted to the MAC layer in order to transmit it toward its destination.

A flow to which a small amount of memory space is allocated, compared with the other flows that have packets waiting, is a priority flow. The differentiated processing allows priority transmission of such flows. Since the real-time flows are, by nature, more sensitive to the delay and to the loss of packets, they benefit from priority processing when the packets in the queue are processed. Thus, at least one data packet from a priority flow is allocated priority transmission, without having previously marked the packets according to a class of quality of service. In one common mode of operation for queue management, in such a case, a packet from the queue, for example a packet from amongst the oldest ones in the queue, is transmitted. This transmitted packet may belong to a non-priority flow, whereas packets that might belong to priority flows are remaining in the queue.

The method then returns to the event wait step E1.

The particular case of flows belonging to a single user has been considered here. The method may also be implemented, user by user, in order to process the flows for each user of a plurality of users, allowing a packet to be supplied from each user to an equitable ordering method, such as for example the method described in the article "Efficient fair queuing using deficit round robin" by M. Shreedhar and G. Varghese, ACM SIGCOMM Computer Communication Review, October 1995.

The description of the method has been presented in a particular embodiment within the LLC layer. The method can also be implemented within the IP layer, within the MAC layer or as soon as an equipment of the network stores data packets to be routed in a queue.

The method according to the invention is applicable to any type of flows, irrespective of the direction of transmission, from the users toward the network or from the network toward the users.

Figure 3:
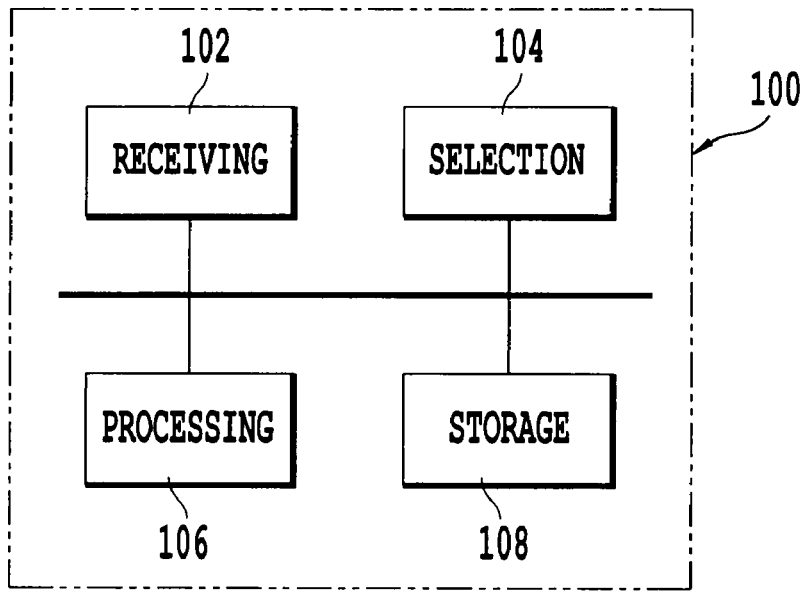
FIG. 3 shows a high level block diagram of a device for processing flows according to the exemplary embodiment.

A device for processing flows will now be described in a particular embodiment of the invention with reference to FIG. 3.

The device 100 for processing flows in a communications network comprises:
  a storage area 108, designed for storing in the form of a queue the data packets of flows together with information relating to the memory space occupied by each of the flows, for which data packets are stored in the storage area 108;
  a module 102 for receiving flows of data packets and for storing the latter in the queue, in order to retransmit them later;
  a module 104 for selection of a flow, designed for selecting a flow from amongst the flows having packets stored in the queue according to a predetermined criterion depending on the memory space allocated to said selected flow in the queue;
  a module 106 for processing at least one data packet from the selected flow, extracted from the queue.

The module 104 is designed for selecting a flow to which the least memory space in the queue is allocated or for selecting a flow to which the most memory space in the queue is allocated from amongst the flows for which data packets are stored in the storage area 108.

The processing module 106 is designed for eliminating a data packet from the queue depending on the flow selected by the selection module 104 and, as the case may be, for transmitting the packet to a lower layer.

The modules 102, 104 and 106 are designed for implementing the method previously described. These are preferably software modules comprising software instructions for allowing the steps of the method previously described to be executed and to be implemented by the device for processing flows. The invention therefore also relates to:
  a program for a device for processing flows, comprising program code instructions designed to control the execution of the steps of the method previously described, when said program is executed by said device;
  a storage medium readable by a device for processing flows on which the program for a device for processing flows is recorded.

The software modules may be stored in or transmitted by a data medium. This can be a hardware storage medium, for example a CD-ROM, a magnetic diskette or a hard disk, or else a transmission medium such as an electrical, optical or radio signal, or a telecommunications network.

The device 100 for processing flows can be integrated into an entity of the communications network. This may be the access equipment 10, 11, 12, the multiplexing node 2, a router of the access network 3, etc.

The invention claimed is:

1. A method of processing packet flows, data packets belonging to a plurality of flows being received by a device of a communications network and stored in a queue thereof for retransmission, comprising:
  selecting a flow of the plurality of flows to which the least memory space in the queue is allocated;
  extracting a data packet from the selected flow and re-transmitting the packet;

selecting a further flow to which the most memory space in the queue is allocated when memory space available in the queue prevents a received packet to be stored;

and eliminating a data packet of the selected further flow from the queue.

2. The method as claimed in claim 1, in which further selection of a flow is repeated, for as long as the memory space in the queue does not allow the received packet to be stored.

3. The method as claimed in claim 2, wherein the data packets are processed within layer 2 or 3 of the OSI reference model.

4. The method as claimed in claim 1, wherein the processing is applied to the plurality of flows of a user of the communications network, prior to processing the plurality of flows for at least one user of the network according to an equitable ordering procedure.

5. A device for processing packet flows in a communications network, data packets belonging to a plurality of flows being received and stored in a queue, comprising:

means for selecting a flow of the plurality of flows to which the least memory space in the queue is allocated;

means for extracting a data packet from the selected flow and re-transmitting the packet;

means for selecting a further flow to which the most memory space in the queue is allocated when memory space available in the queue prevents a received packet to be stored; and means for eliminating a data packet of the selected further flow from the queue.

6. A non-transitory computer readable storage medium encoded with computer program instructions which cause a device to execute a method of processing flows, data packets flowing into various flows being received by the device of a communications network and stored in a queue for retransmission, comprising:

selecting a flow of the plurality of flows to which the least memory space in the queue is allocated to;

extracting a data packet from the selected flow and re-transmitting the packet;

selecting a further flow to which the most memory space in the queue is allocated when memory space available in the queue prevents a received packet to be stored;

and eliminating a data packet of the selected further flow from the queue.

7. The non-transitory computer readable storage medium as claimed in claim 6, in which the further selection of a flow is repeated, for as long as memory space in the queue does not allow the received packet to be stored.

8. The non-transitory computer readable storage medium as claimed in claim 6, wherein the data packets are processed within layer 2 or 3 of the OSI reference model.

9. The non-transitory computer readable storage medium as claimed in claim 6, wherein the processing is applied to the plurality of flows of a user of the communications network, prior to processing the plurality of flows for at least one user of the network according to an equitable ordering procedure.

* * * * *